United States Patent [19]

Shuert

[11] Patent Number: 5,108,529
[45] Date of Patent: Apr. 28, 1992

[54] METHOD OF FORMING A TWIN SHEET PLASTIC PALLET USING PREFORMING

[76] Inventor: Lyle H. Shuert, 1034 Stratford Pl., Bloomfield Hills, Mich. 48013

[21] Appl. No.: 403,169

[22] Filed: Sep. 5, 1989

[51] Int. Cl.$^5$ .................... B29C 51/04; B29C 51/10
[52] U.S. Cl. ..................... 156/214; 156/212; 156/285; 264/322; 264/545; 264/549; 264/550; 425/388
[58] Field of Search ............... 264/545, 549, 550, 511, 264/512, 516, 322, 320; 156/212, 214, 285, 229; 425/388

[56] References Cited

U.S. PATENT DOCUMENTS

| | | |
|---|---|---|
| 2,670,501 | 3/1954 | Michiels ................. 264/545 |
| 3,291,874 | 12/1966 | Negoro ................... 264/549 |
| 3,404,642 | 10/1968 | Belcher et al. ........... 108/51 |
| 3,604,368 | 9/1971 | Baxter et al. ............ 108/57 |
| 3,610,173 | 10/1971 | McIlwraith et al. ........ 108/57 |
| 3,717,922 | 2/1973 | Witkowski ................ 29/421 |
| 3,955,266 | 5/1976 | Honami et al. ............ 264/511 |
| 4,427,476 | 1/1984 | Beck et al. .............. 264/549 |
| 4,428,306 | 1/1984 | Dresen et al. ............ 108/53.3 |
| 4,550,830 | 11/1985 | Shuert ................... 206/386 |
| 4,606,278 | 8/1986 | Shuert ................... 108/51.1 |
| 4,742,781 | 5/1988 | Shuert ................... 108/53.3 |
| 4,765,252 | 8/1988 | Shuert ................... 108/55.1 |
| 4,856,657 | 8/1989 | Shuert ................... 206/600 |
| 4,879,956 | 11/1989 | Shuert ................... 108/53.3 |

FOREIGN PATENT DOCUMENTS

| | | | |
|---|---|---|---|
| 53-136061 | 11/1978 | Japan ................. 264/545 |
| 55-159937 | 12/1980 | Japan ................. 264/516 |
| 58-193123 | 11/1983 | Japan ................. 264/549 |
| 61-175025 | 8/1986 | Japan ................. 264/511 |
| 1131361 | 10/1968 | United Kingdom ........ 264/549 |

*Primary Examiner*—Jan H. Silbaugh
*Assistant Examiner*—Catherine Timm
*Attorney, Agent, or Firm*—Krass & Young

[57] ABSTRACT

A method of forming a twin sheet plastic pallet formed of an upper and a lower sheet and utilizing an upper male mold having downwardly extending leg protrusions and a lower female mold having complementary upwardly opening leg cavities. The method includes introducing the lower sheet between the spaced upper and lower molds, vacuum forming the lower sheet to the molding surfaces of the upper mold, vacuum forming the lower sheet to the molding surfaces of the lower mold, introducing the upper sheet between the spaced molds, vacuum forming the upper sheet to the molding surfaces of the upper mold, and bringing the upper and lower molds together with their leg portions in nested relation to fuse the upper and lower sheets together along their peripheries and at the interfaces their nested leg portions to form the final pallet.

11 Claims, 4 Drawing Sheets

METHOD OF FORMING A TWIN SHEET PLASTIC PALLET USING PREFORMING

BACKGROUND OF THE INVENTION

This invention relates to a method of forming a plastic article and more particularly to a method of forming a plastic pallet.

Pallets have traditionally been formed of wood. Wood pallets however have many disadvantages. For example they are subject to breakage and thus are not reusable over an extended period of time. Wood pallets also take up a considerable amount of valuable space in the warehouse when they are not in use. In an effort to solve some of the problems associated with wood pallets, plastic pallets have been developed and employed with varying degrees of success. One form of highly successful plastic pallet embodies a twin sheet construction in which an upper plastic sheet is thermoformed over a male mold having downwardly extending leg protrusions, a lower plastic sheet is thermoformed over a female mold having leg cavities complemental to the leg protrusions on the male mold, and the sheets are selectably fused or knitted together with the hollow leg protrusions of the upper sheet nested in the hollow leg cavities of the lower sheet to form a plastic pallet having a generally planar platform structure and a plurality of peripherally spaced hollow fused legs extending downwardly from the platform structure and opening in the upper face of the platform structure.

Whereas this twin sheet pallet has been highly successful and has been widely commercialized, problems occur in the forming of the lower sheet since the draw ratio, defined as the total bottom and side wall area of each leg cavity divided by the area of the leg cavity opening in the upper face of the platform structure, is very high with the result that the plastic material of the lower sheet thins out significantly in the bottom regions of the leg cavities in the female mold as the sheet is thermoformed downwardly into the cavities with the result that the lower portions of the side walls of the leg portions of the lower sheet, as well as the bottom walls of the leg portions, are significantly thinned out relative to the starting thickness of the sheet. Since this is a region of high impact and high wear in the completed pallet, the relatively thin configuration of the lower sheet in the bottom regions of the legs can result in premature pallet failure. In effort to overcome this problem, it has been proposed to utilize a thicker sheet of plastic for the bottom sheet than for the top sheet so that, despite the leg thinning resulting from the high draw ratio in the female mold, the final composite thickness of the lower portions of the legs of the completed pallet will be acceptable. However, this solution results in a heavier pallet for a given strength specification, as well as in a more expensive pallet.

SUMMARY OF THE INVENTION

This invention is directed to the provision of an improved method of forming a plastic pallet.

More specifically, this invention is directed to the provision of an improved method of forming a twin sheet plastic pallet.

Yet more specifically, this invention is directed to the provision of a method of forming a twin sheet plastic pallet in which pallet strength is maximized for a given starting weight of sheet plastic material.

According to the invention, the lower plastic sheet is first substantially thermoformed to the leg protrusions of the male mold and is thereafter thermoformed into the leg cavities of the female mold. This methodology avoids the thinning problems resulting from the high draw ratios in the leg cavities of the female mold and thereby results in a final twin sheet pallet having acceptable leg bottom wall thicknesses without resorting to the use of an over-thickness lower sheet.

The molding of the lower sheet to the male mold may comprise a total thermoforming of the upper sheet to the molding surfaces of the male mold or may comprise a substantial conforming of the lower sheet to the molding surfaces of the male mold. In either case, the extent of thermoforming ultimately required in the cavities of the female mold is reduced to the point where no substantial thinning of the sheet occurs in the bottoms of the leg portions during the forming operation in the female mold.

In the disclosed embodiment of the invention methodology, the clamped and heated lower sheet is moved into position between the spaced upper and lower molds; the male mold is moved downwardly into contact with the upper surface of the lower sheet to form a seal between the upper surface of the sheet and the periphery of the male mold; a vacuum is created in the sealed volume between the sheet and the male mold surfaces to suck the sheet upwardly into conformance with the mold surfaces in a vacuum forming operation; the lower female mold is raised to form a seal between the undersurface of the sheet and the periphery of the female mold; the vacuum on the upper male mold is released; and a vacuum is created in the volume between the sheet and the molding surfaces of the lower female mold to suck the sheet downwardly into total conformance with the molding surfaces of the female mold. The upper mold is now raised to a position clear of the molded lower sheet, the clamping means holding the lower sheet are released, and the lower mold, carrying the finally molded lower sheet, is lowered to allow room between the molds for the insertion of the clamped and heated upper sheet. The upper male mold is now moved downwardly to provide a seal between the upper sheet and the periphery of the male mold; a vacuum is created in the sealed space between the upper sheet and the molding surfaces of the male mold to suck the upper sheet upwardly into conformance with the molding surfaces of the upper mold; the lower mold, carrying the molded lower sheet, is raised to bring the leg portions of the upper and lower sheets into nesting relation and bring the peripheral portions of the upper and lower sheets into contiguous relation; and pressure is applied to fuse the upper and lower sheets around their contiguous peripheries and at the interfaces of their nested leg portions to form the completed twin sheet pallet.

DETAILED DESCRIPTION OF THE PREFERRED EMBODIMENT

Figure 11:
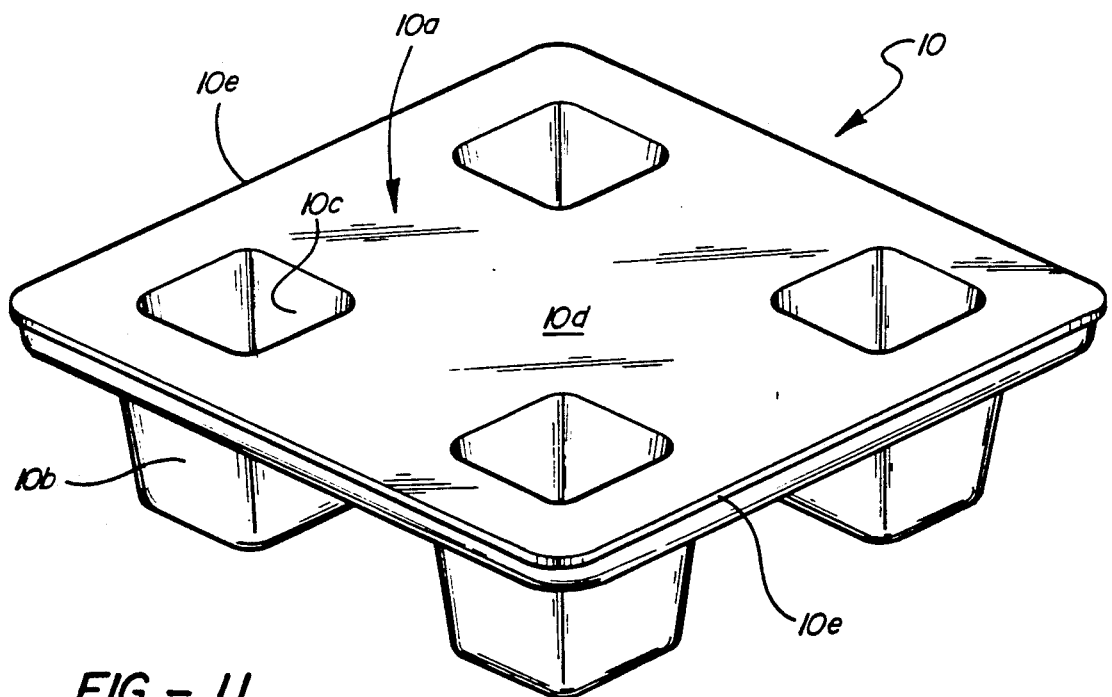
FIG. 11 is a perspective view of a twin sheet plastic pallet formed according to the invention method.

The invention method is utilized to produce a plastic twin sheet pallet 10 of the type seen in FIG. 11 including a generally planar platform structure 10a and a plurality of hollow downwardly extending leg portions 10b at peripherally spaced location on the platform structure and each opening at 10c in the upper face 10d of the platform structure so as to allow nesting of the pallets. Whereas the pallet seen in FIG. 11 is shown for simplicity as having leg portions 10b only at the corners of the pallet it will be understood that various other leg arrangements are possible such as the nine leg arrangement in common usage wherein an intermediate leg is provided along each side of the pallet, to provide a total of eight legs spaced peripherally around the platform structure, and a ninth leg is provided in the center of the pallet to provide support for the central region of the platform structure.

Whereas various plastic materials may be used for the sheets to form the twin sheet pallet it has been found that high density polyethylene (having for example a density of approximately 0.950 grams per cubic centimeter) provides a preferred material since, in a heated state, it readily and totally fuses with itself and since it takes on heat slowly and releases heat slowly so as to be compatible with the relatively long cycle times required for forming plastic pallets utilizing the twin sheet methodology.

The thicknesses of the sheets may also vary depending upon the application but a starting gage of 0.150 has been found satisfactory for most applications. Also, although not shown, it will be understood that the invention method, in accordance with known twin sheet methodology, is carried out utilizing multi-station rotary equipment which includes sheet heating oven stations and at least one forming station and wherein individual sheets of heated plastic are sequentially fed to the forming station for thermoforming with respect to the upper or lower molds with the sheets held and transported between the stations by rectangular clamp frames engaging the periphery of the sheets. An upper male mold or platen 12 and a lower female mold or platen 14 are positioned at the forming station and are movable upwardly and downwardly in known manner by means not shown to accomplish the various forming operations.

Male mold 12 is shown somewhat schematically and includes a generally planar platform structure molding surface 12a, a plurality of peripherally spaced downwardly extending leg molding protrusion surfaces 12b, and a peripheral sealing surface 12c. Passages 12d coact with vacuum equipment (not shown) to create a vacuum condition along the molding surfaces 12a and 12b.

Although molds 12 and 14 are seen two-dimensionally in FIGS. 1-10, is will be understood that each mold has a rectangular size and shape in plan view generally corresponding to the rectangular size and shape of the completed pallet as seen in FIG. 11.

Lower female mold or platen 14 defines an upwardly facing generally planar platform molding surface 14a, a plurality of upwardly opening leg molding cavity surfaces 14b generally complemental to the downwardly extending leg molding protrusion surfaces 12b on the male mold, and a peripheral sealing surface 14c. Passages 14d coact with vacuum equipment (not shown) to create a vacuum condition along the molding surfaces 14a and 14b. The manner in which the invention methodology is utilized to produce a twin sheet pallet is shown sequentially in FIGS. 1-10.

Figure 1:
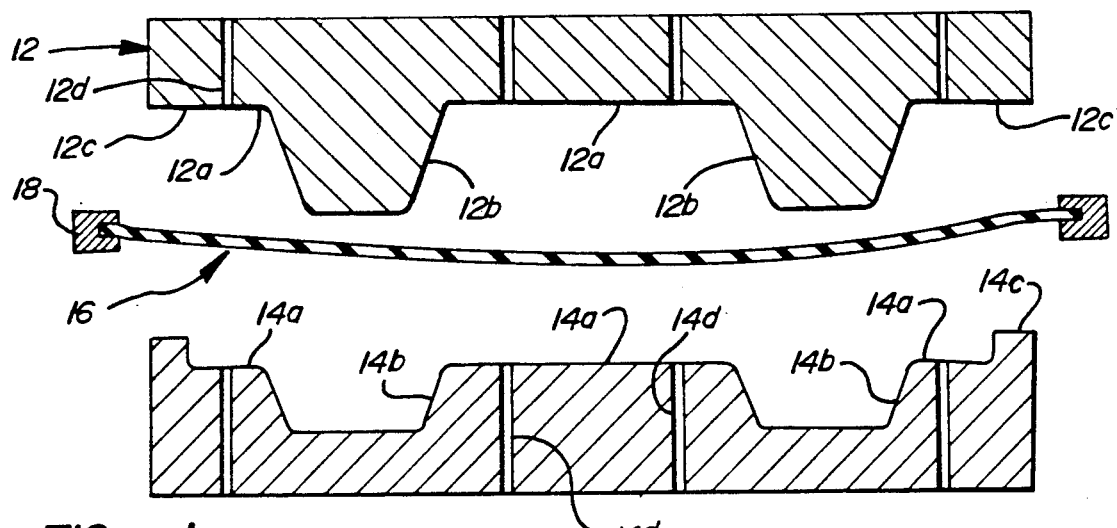
FIGS. 1-10 illustrate successive steps in the invention method to form a twin sheet plastic pallet.

In FIG. 1, a first or lower plastic sheet 16 is seen positioned between the upper male mold 12 and the lower female mold 14 by a clamp frame 18. It will be understood that the sheet 16 has previously been heated in an oven station of the rotary equipment and moved by the clamp frame 18 to the position shown in FIG. 1. It will further be understood that sheet 16 is rectangular and is oversized in all directions with 18 respect to rectangular molds 12 and 14, and that frame is rectangular and clampingly grips the sheet along all four sides of the sheet with the sheet, as shown, sagging by its own weight between the spaced edges of the frame in a generally catenary configuration. As previously indicated, molds 12 and 14 are movable upwardly and downwardly by means not shown during the various steps involved in forming the twin sheet plastic pallet. Male mold 12 is shown in its extreme, raised position in FIG. 1 and female mold 14 is shown in its extreme, lowered position in FIG. 1.

Figure 2:
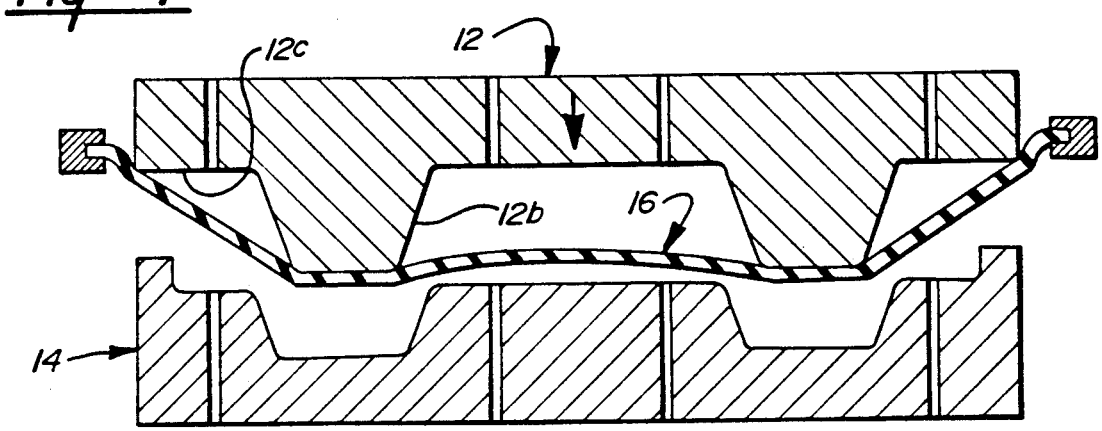

After the heated lower sheet 16 has been positioned by the frame 18 between the spaced upper and lower molds as seen in FIG. 1, the upper male mold 12 is lowered as seen in FIG. 2 to bring the leg protrusion surfaces 12b into contact with spaced points on the upper face of the sheet 16 and to move the periphery of the upper face of the sheet into sealing engagement with the peripheral sealing surface 12c so as to form a sealed volume between the upper face of the sheet and the molding surfaces of the male mold. As shown, the male mold is lowered to an extent to bring the peripheral sealing surface 12c to a location slightly below the plane of the clamping frame 18 so that the peripheral edge of sheet 16 wraps upwardly around the periphery of the mold to ensure a positive seal between the sheet and the mold. A vacuum is now applied through passages 12d to form a vacuum along the molding surfaces of the male mold so as to pull the heated sheet upwardly against the molding surfaces of the male mold in a vacuum forming process.

Figure 3:
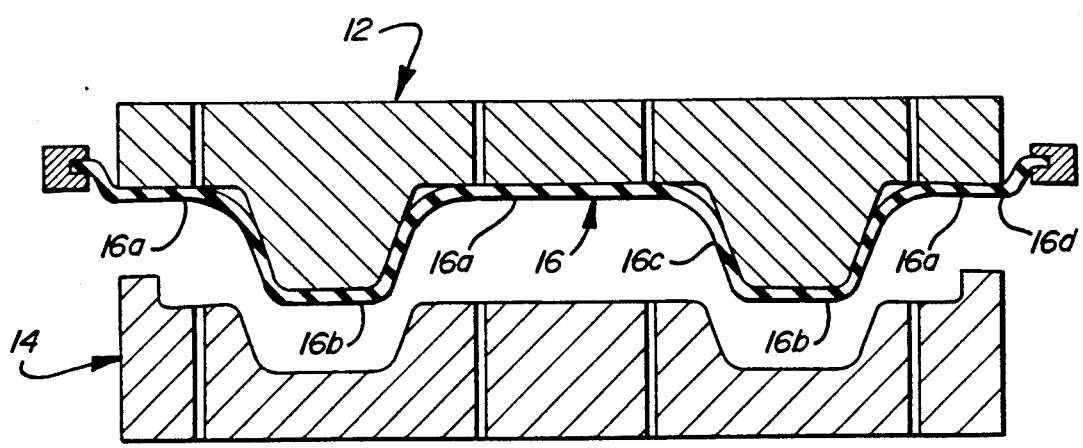

The disposition of the lower sheet 16 following the vacuum forming process is seen in FIG. 3 wherein, as shown, the sheet has been sucked into substantially total conformity to the molding surfaces of the upper mold. Depending upon the particular application, the sheet may be sucked into total conformity with the molding surfaces of the upper mold or may, as shown, be sucked into substantial conformity with the molding surfaces on the upper mold.

It should be noted that any thinning or drawing out of the material of sheet 16 as it is sucked upwardly into conformity with the molding surfaces of the male mold occurs with respect to the platform portion 16a of the sheet with the bottom portions 16b of the leg portions 16c of the sheet retaining substantially their pre thermoforming thickness and the side walls of the leg portions experiencing only minimal thinning.

Figure 4:
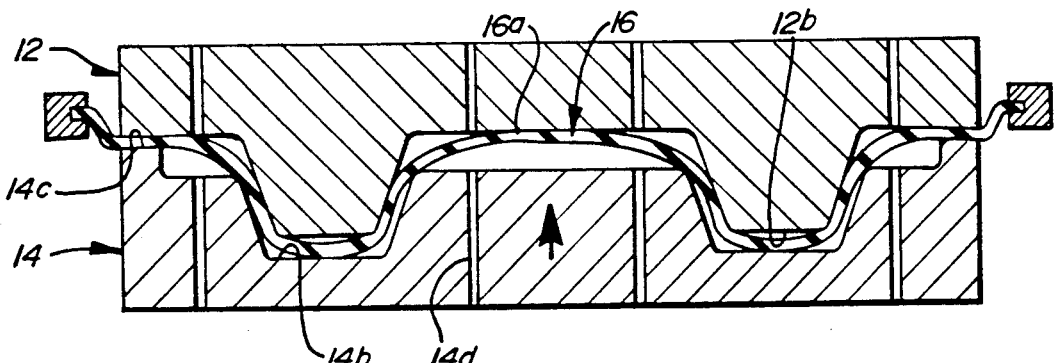
Figure 5:
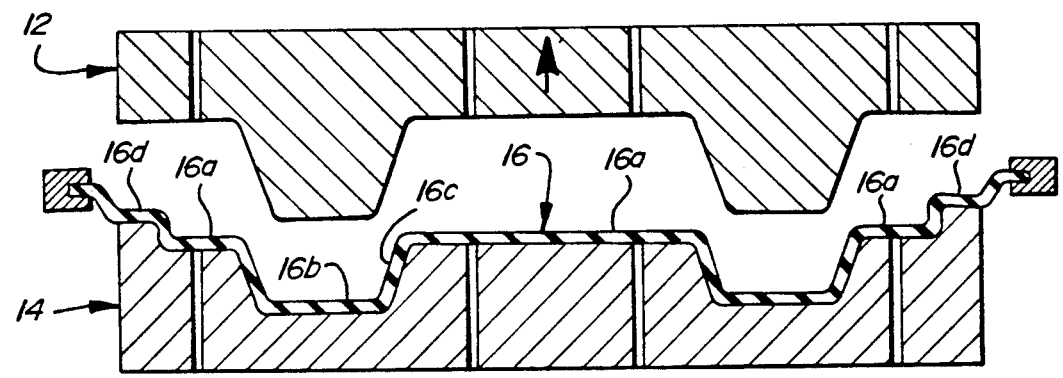

Following the vacuum forming operation of FIG. 3 to preform the lower sheet 16 by the use of the upper mold 12, and with the sheet still in a hot flowable state, the lower female mold 14 is raised as seen in FIG. 4 to bring the leg molding cavity surfaces 14b into nesting disposition with respect to the leg molding protrusion surfaces 12b, with the preformed upper sheet 16 disposed therebetween, and to bring the peripheral sealing surface 14c of the lower female mold into sealing engagement with the lower periphery of the sheet 16 so as to form a sealed volume between the lower surface of the sheet 16 and the molding surfaces of the lower mold 14, whereafter the vacuum to upper mold 12 is discontinued to release sheet 16 and vacuum is applied through vacuum passages 14d to suck the sheet 16 downwardly into total conformity with the molding surfaces of the lower female mold 14, whereafter, as seen in FIG. 5, the upper mold 12 is raised to its raised position, clear of the raised lower mold 14, with the fully formed lower sheet 16 positioned against the molding surfaces of lower mold 14.

Figure 6:
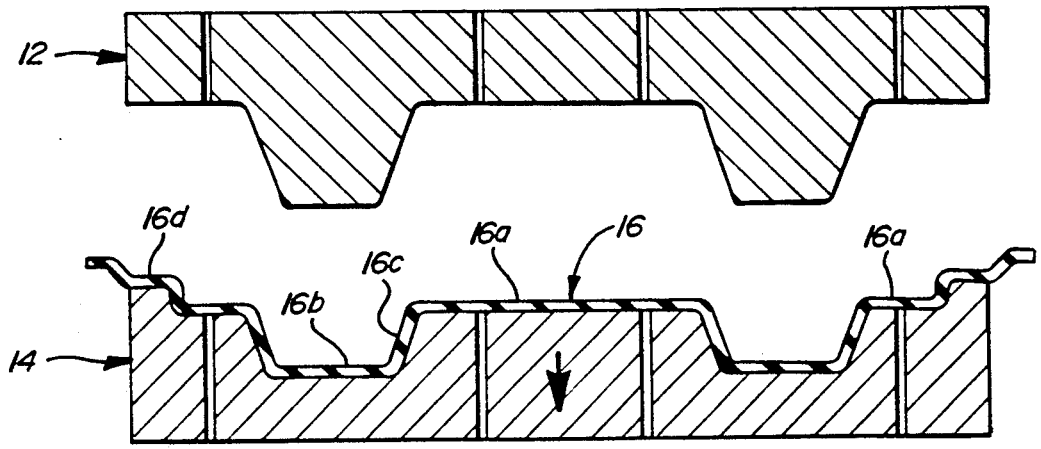
Figure 7:
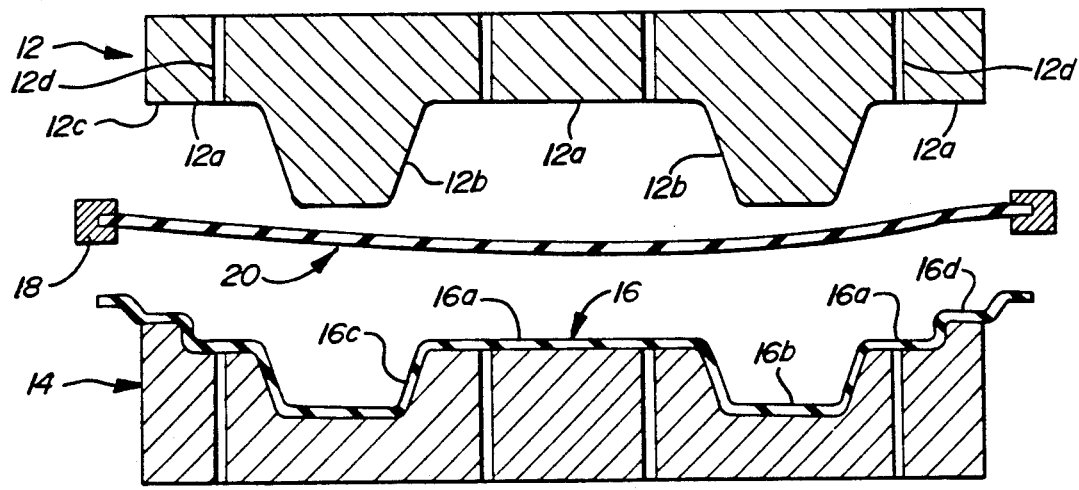
Figure 8:
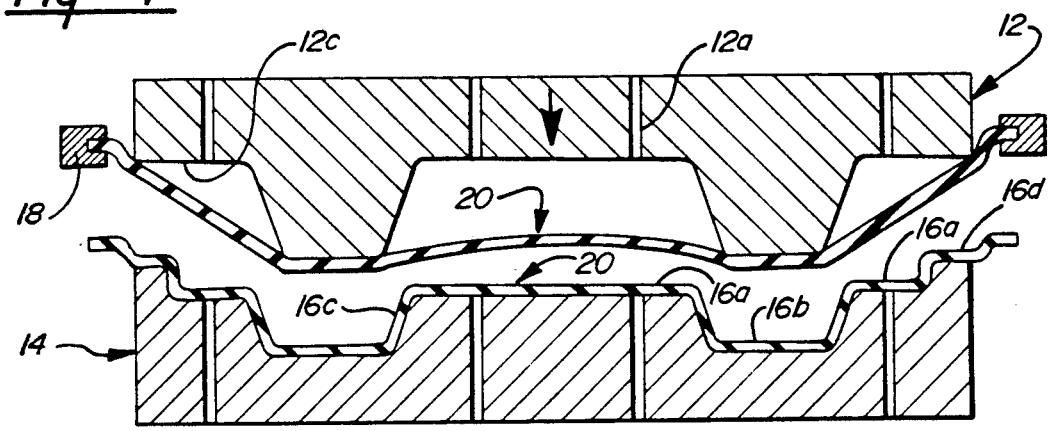
Figure 9:
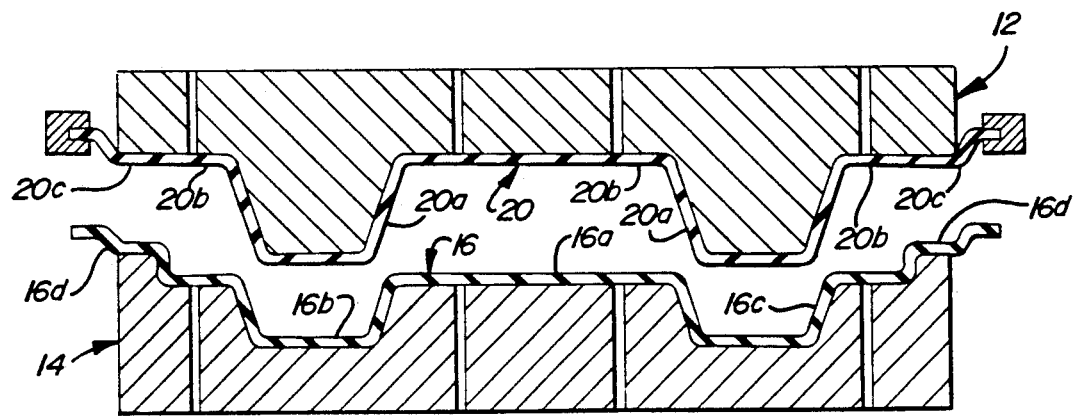

As seen in FIG. 6, the clamp frame 18 is now released from engagement with the peripheral edge of the fully formed lower sheet 16 and the lower female mold 14, carrying the fully formed lower sheet 16, is lowered to its extreme lowered position whereafter, as seen in FIG. 7, a second heated upper sheet 20 is moved from an oven station into position between the raised upper mold 12 and the lowered lower mold 14 by a clamp frame 18, whereafter, as seen in FIG. 8, the upper mold 12 is lowered to establish contact between the protrusion mold surfaces 12b and the upper face of the sheet and wrap the periphery of the sheet upwardly around the periphery of the upper mold so as to establish a seal between the periphery of the upper face of the sheet and the peripheral sealing surface 12c of the upper mold, whereafter vacuum is applied through vacuum channels 12d to draw the upper sheet 20 upwardly into total conformity with the molding surfaces of the upper mold 12 as seen in FIG. 9.

Figure 10:
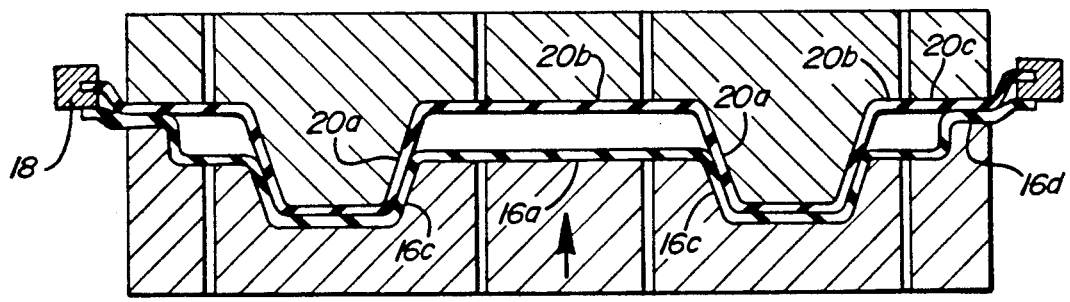

Following the vacuum forming of the upper sheet 20, and as seen in FIG. 10, the lower mold 14 is now raised to bring the lower sheet 16 into juxtaposition with the upper sheet 20 and, specifically, to move the leg portions 16c of the lower sheet into nesting relation with the leg portions 20a of the upper sheet, to move the platform portions 16a of the lower sheet into parallel spaced relation to the platform portions 20b of the upper sheet, and to move the peripheral portion 16d of the lower sheet into contiguous relation to the peripheral portion 20c of the upper sheet. Following positioning of the lower sheet in juxtaposition to the upper sheet as seen in FIG. 10, pressure is applied as between the upper and lower molds to cause the still heated sheets to knit or fuse along their contiguous interfaces and, specifically, along the contiguous peripheral interfaces 16d and 20c and the contiguous interfaces between the nested leg portions 16c, 20a so as to form the completed twin sheet pallet.

It will be understood that leg cavity surfaces 14b on lower mold 14, while generally complemental in size, shape and peripheral spacing to leg protrusion surfaces 12b on upper mold 12, are shallower than protrusions 12b so as to provide the desired spacing as between the platform portions 20b, 16a of the upper and lower sheets in the final pallet.

It will further be understood that the entire process, as shown in FIGS. 1-10, is carried out in a total cycle time such that the sheets remain in their heated fusible condition so as to allow the individual thermoforming steps and so as to allow the final fusion or knitting of the upper and lower sheets as shown in FIG. 10. As previously indicated, polyethylene is a preferred plastic material for use in carrying out the invention methodology because of its property of taking on heat slowly and releasing heat slowly so as to remain in a heated flowable state for the entire cycle time (for example, between 30 to 60 seconds) required to move the hot sheets individually from the ovens to the molds, vacuum form them separately to the molds, and then bring them together in the final fusion or knitting operation.

After the completed pallet has been suitably cooled, the upper and lower molds 12 and 14 are raised and lowered respectively to their fully raised and lowered positions to allow removal of the completed pallet from the molds, whereafter the clamp frame is removed and the extreme peripheral fused edge of the pallet is trimmed to form the completed pallet as seen in FIG. 11.

In the completed pallet, the fused leg portions 16c, 20a of the upper and lower sheets form the legs 10b of the pallet; the spaced platform portions 16a, 20b of the upper and lower sheets form the platform structure 10a of the pallet with the upper surface of the upper sheet 20b forming the upper surface 10d of the platform structure 10a of the pallet; the fused and trimmed peripheral portions 16d, 20c of the upper and lower sheets form the peripheral edge 10e of the pallet; and the upper openings of the leg portions 20a of the upper sheet define the leg openings 10c in the upper face of the platform structure 10a of the pallet.

As previously indicated, although a pallet having legs only at its corners is illustrated in FIGS. 1 through 11, a more typical commercial embodiment would involve a pallet having intermediate legs along each side of the pallet as well as a central leg so as to provide a total of nine legs for the pallet. It will also be understood that suitable connecting or reinforcing means would typically be provided between the spaced platform portions 16a, 20b of the upper and lower sheets so as to provide structural rigidity for the platform structure of the pallet. These connections or fusions have been omitted for purposes of clarity since they form no part of the present invention. However, a preferred connecting structure between the platform portions of the upper and lower sheets is shown in applicant's co-pending U.S. patent application Ser. No. 144,419 filed Jan. 14, 1988.

The invention methodology will be seen to allow the formation of a twin sheet pallet having adequate strength in the high impact regions proximate the lower portions of the legs without resort to the use of a thicker, heavier, and more expensive plastic sheet for the lower sheet of the pallet. Specifically, the invention methodology, whereby the lower sheet is first preformed to the molding surfaces of the upper male mold, eliminates the problem encountered in the prior art methodology wherein the high draw ratio, as defined by the total bottom and sidewall area of each leg wall cavity divided by the area of the leg cavity opening in the upper face of the platform structure, resulted in substantial thinning of the lower sheet as it was pulled into the bottom regions of the leg cavities with a resultant weakness in the strength of the lower leg portions of the final pallet.

The invention methodology in effect minimizes the extent of forming of the leg portions of the lower sheet that is actually carried out during the forming of the lower sheet to the lower mold so as to thereby minimize the thinning action that might otherwise occur as the plastic material of the lower sheet is pulled downwardly into the mold cavities of the lower mold.

Whereas preferred embodiments of the invention have been illustrated and described in detail, it will be apparent that various changes may be made in the disclosed embodiment without departing form the scope or spirit of the invention. For example, although the invention methodology as specifically disclosed utilizes an upper male mold and a lower female mold, and whereas certain of the claims describe the invention in the context of an upper male mold and a lower female mold, it will be understood that the relative positions of the male and female molds may be reversed without departing from the scope or spirit of the invention.

I claim:

1. A method of forming a twin sheet plastic article comprising the steps of:
   providing a male mold having protrusions;
   providing a female mold having a molding surface configuration differing from said male mold and having cavities generally complemental to said protrusions;
   thermoforming a first plastic sheet substantially to said male mold protrusions;
   then thermoforming said first plastic sheet to said female mold including said cavities;
   thermoforming a second plastic sheet to said male mold while said first plastic sheet is maintained in said female mold; and
   then knitting said first and second sheets together at selected interfaces by applying pressure between said male and female molds.

2. A method according to claim 1 wherein:
   said thermoforming steps comprise vacuum forming steps.

3. A method according to claim 1 wherein:
   said article is a plastic pallet having legs spaced about its periphery; and
   said protrusions and cavities are provided respectively at peripherally spaced locations on said male and female molds and correspond generally to the legs of said pallet.

4. A method of forming a twin sheet plastic pallet of the type including a generally planar platform structure and a plurality of hollow legs extending downwardly from said platform structure and openings in the upper face of said platform structure, said method comprising the steps of:
   providing a male mold having a downwardly facing platform molding surface and a plurality of downwardly extending leg molding protrusion surfaces;
   providing a female mold having an upwardly facing platform molding surface and a plurality of upwardly opening leg molding cavity surfaces said surfaces in said female mold having configurations differing from said male mold surfaces and said leg molding cavity surfaces being generally complemental to said downwardly extending leg molding protrusion surfaces on said male mold;
   thermoforming a first plastic sheet substantially to said male molding surfaces;
   then thermoforming said first sheet to said female molding surfaces to form a platform portion and upwardly opening hollow leg portions;
   thermoforming a second plastic sheet to said male molding surfaces to form a platform portion and downwardly extending hollow leg portions while said first sheet is maintained on said female molding surfaces; and
   then knitting said first and second sheets together at selected interfaces to form said pallet by applying pressure between selected said male and female molding surfaces.

5. A method according to claim 4 wherein:
   said thermoforming steps comprising vacuum forming steps.

6. A method according to claim 5 wherein:
   said selected interfaces include peripheral portions of each of said sheets as well as said leg portions of each of said sheets.

7. A method of forming a twin sheet plastic pallet formed of an upper and a lower plastic sheet and utilizing an upper male mold having downwardly extending leg protrusions and a lower female mold having a molding surface configuration differing from said male mold and having upwardly opening leg cavities, said method comprising the steps of:
   positioning a heated lower sheet between the spaced upper and lower molds;
   moving the upper male mold downwardly to bring the leg protrusions into contact with the upper face of the lower sheet and form a seal as between the periphery of the upper male mold and the peripheral upper surface of the lower sheet;
   thermoforming the lower sheet upwardly toward the molding surfaces of the upper male mold;
   then raising the lower female mold into position immediately beneath the upper male mold with the lower sheet positioned therebetween;
   then thermoforming the lower sheet downwardly against the molding surfaces of the lower female mold;
   separating the molds with the formed lower sheet remaining with the lower female mold;
   positioning a heated upper sheet between the spaced molds while the formed lower sheet remains with the lower female mold;
   thermoforming the upper sheet to the molding surfaces of the upper mold; and
   then bringing the molds together to selectively fuse the upper and lower sheets and form the twin sheet pallet.

8. A method according to claim 7 wherein said thermoforming steps comprise vacuum forming.

9. A method according to claim 7 wherein said lower sheet is substantially thermoformed to the molding surfaces of said upper mold prior to being thermoformed onto said lower mold.

10. A method according to claim 7 wherein said lower sheet is substantially totally thermoformed to the molding surfaces of said upper male mold prior to being thermoformed to the molding surfaces of said lower female mold.

11. A method according to claim 7 wherein said upper and lower sheets are fused together around their outer peripheries and at the interfaces of their leg portions and are otherwise maintained in generally parallel spaced relation to form a platform structure.

* * * * *